United States Patent Office 3,801,492
Patented Apr. 2, 1974

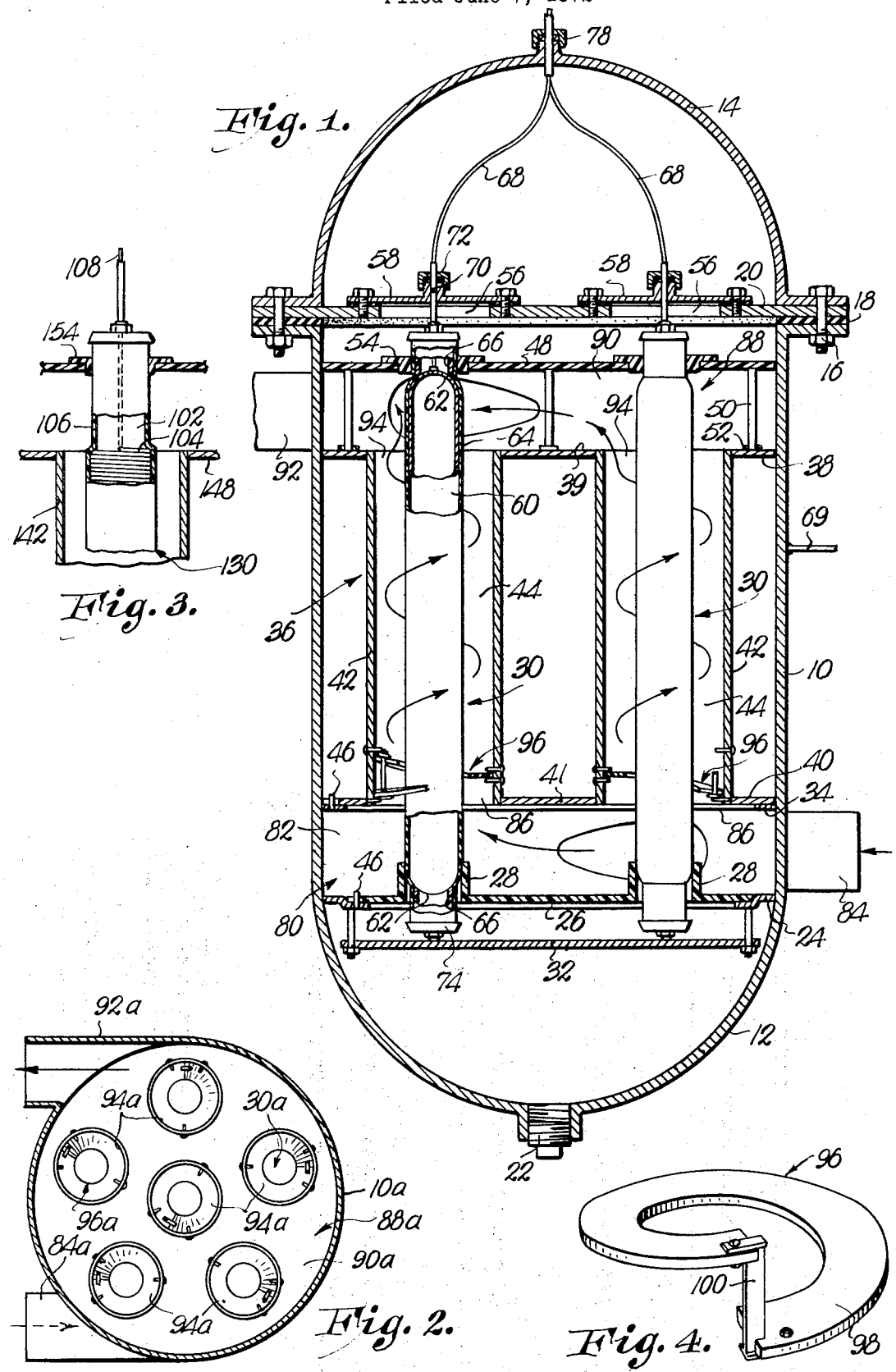

3,801,492
APPARATUS FOR ELECTRICALLY TREATING LIQUIDS
Arthur S. King, Prairie Village, Kans.
(9013 W. 51st Terrace, Merriam, Kans. 66203)
Continuation-in-part of abandoned application Ser. No. 38,011, May 18, 1970. This application June 7, 1972, Ser. No. 260,477
Int. Cl. B01d *13/02*
U.S. Cl. 204—302       10 Claims

ABSTRACT OF THE DISCLOSURE

A fluid treater has multiple flow paths in order to treat large quantities of water, for example, with an electric field without substantial pressure drop. The treater is provided with a lower intake manifold having a configuration which causes essentially laminar flow of the water in the manifold along a spiral path having convolutions of successively reduced diameter. Outlet ports of the manifold are spaced along such path and are in communication with tubular, outer electrodes through which the water is swirled upwardly by helical guide screws to a similarly arranged upper discharge manifold where the plural paths are recombined. Through the use of a set of inner electrodes coaxially disposed within the outer electrodes, the water in each path is subjected to a radial electric field in the annular passage defined by the respective inner and outer electrode pair. The tubular wall of each outer electrode is inset to concentrate the electrostatic field in the annular passage, the inner electrode having an electrically conductive outer surface at least coextensive with the tubular wall. The construction permits any of the inner electrodes to be readily replaced without disassembling the treater.

CROSS-REFERENCES

This is a continuation-in-part of my copending application Ser. No. 38,011, filed May 18, 1970, and entitled High Capacity Fluid Treater Employing Concentrated Electric Fields and now abandoned.

The present invention relates to improvements in apparatus for treating fluids with electric fields of the type shown and described in my U.S. Letters Patent No. 3,585,122, issued June 15, 1971, and entitled "Apparatus for Treatment of Fluids With Electric Fields." Although the various treater configurations disclosed and described in my aforesaid patent effectively execute the electric field treatment set forth therein, it has been found that such treaters may be somewhat limited in the quantity of flowing fluid that may be handled without inducing a pressure drop in the line. For example, city water systems and industrial water systems employ pipe sizes on the order of 24 inches in diameter. Manifestly, this represents a very large quantity of water requiring special consideration from a hydrodynamic standpoint with respect to the minimization of pressure drop and unnecessary restriction of the volume of water that can be treated over a given time period.

Accordingly, it is an important object of this invention to provide an electric field treater capable of handling a large quantity of water or other fluid without substantial pressure drop, and wherein turbulence within the treater structure is minimized to assure smooth flow and, therefore, minimize the pressure drop experienced in the treater.

As a corollary to the foregoing object, it is an important aim of the present invention to provide a high capacity treater as aforesaid having multiple flow paths, and wherein the flow patterns through the treater are constant.

In carrying out the above goals an important object of the instant invention is to provide specially configured intake and discharge manifolds for the treating fluid which cooperate with helical guide screws within the flow passages of the treater to confine and maintain the flowing fluid to spiraling paths of travel throughout its journey through the treater.

An additional important object of this invention is the provision of a fluid treater having intake and discharge manifolds as aforesaid interconnected by a flow passage wherein the intake manifold is disposed at a lower elevation than the discharge manifold such that fluid flowing through a field established in such passage is forced by gravity into intimate contact with the field-producing surfaces of the passage for laminar flow and maximum field exposure.

Another important object of the invention is to provide a treater as aforesaid of unique construction which facilitates the initial assembly of the structural components of the treater necessary to provide the desired multiple flow path arrangement, and permits burned-out electrodes to be readily replaced without disassembly.

Still another important object of the invention is to provide a multiple path treater as aforesaid which, by virtue of the flow characteristics that are imparted to the fluid therein, is largely self-cleaning and prevents the buildup of deposits on the various internal surfaces of the treater structure that are in contact with the flowing fluid.

Furthermore, an important aim of the present invention is to provide a novel electrode arrangement for either single or multiple path treaters which concentrates the electric field in the region of fluid flow through utilization of a sturctural configuration of straightforward design not characterized by close dimensional tolerances.

In the drawing:

FIG. 1 is essentially a vertical cross-sectional view of the treater of the present invention taken centrally thereof, the inner electrode units being revealed both in elevation and partly broken away to show constructional details;

FIG. 2 is a simplified, horizontal cross-sectional view through the intake manifold of an alternative form of the treater looking downwardly;

FIG. 3 is a fragmentary view showing a second embodiment of the inner electrode unit utilized in the treater; and FIG. 4 is an enlarged perspective view of one of the spiral guide ramps employed at the entrance of each treating passage.

Referring to FIG. 1, it may be seen that the outer housing of the treater has a generally cylindrical configuration with a dome-shaped top and bottom. Such housing comprises a tank provided with a tubular sidewall 10, an integral, hemispherical bottom 12, and a removable cover 14 of hemispherical shape which closes the top of the tank and is normally held in place by bolts 16 that draw together annular flanges on the cover 14 and the sidewall 10. An annular gasket 18 and a circular top plate 20 are sandwiched between the mating flanges and thus are tightly held by the bolts 16. Accordingly, the tank is completely sealed and fluid-tight, the bottom 12 thereof being provided with a removable drain plug 22.

A shelf ring 24 within the tank is welded to the sidewall 10 at the bottom thereof and projects inwardly for the purpose of supporting a lower disc 26 resting thereupon. The disc 26 is composed of insulating material and is provided with a plurality of upright, tubular alignment sockets 28, each of which receives the lower end portion of an elongated, tubular, upright electrode unit 30. A circular support plate 32 is suspended from the shelf ring 24 and directly underlies and is engaged by the lowermost extremities of the electrode units 30, thereby limiting downward movement of the units 30 in the sockets 28 and serving as a bottom support for such units.

A second shelf ring 34 is welded to the sidewall 10 above the ring 24 and serves to support an electrode assembly 36 which rests on the shelf provided by the ring 34. The assembly 36 has an upper circular plate 38, a lower circular plate 40 overlying the ring 34, and a plurality of upright, cylindrical tubes 42 welded at their open ends to the upper and lower plates 38 and 40. It may be appreciated from viewing FIG. 1 that the upper and lower plates 38 and 40 are provided with circular openings which receive the ends of the tubes 42; thus annular passages 44 throughout the full length of the electrode assembly 36 are defined by the tubes 42 and respective electrode units 30 therewithin. Key pins 46 on the shelf rings 24 and 34 assure that the lower disc 26 (with its aligning sockets 28) and the electrode assembly 36 are in proper positional interrelationship to coaxially dispose each tube 42 and the electrode unit 30 therewithin. Accordingly, each tube 42 and associated unit 30 form outer and inner electrodes respectively, the various inner and outer electrode pairs providing multiple flow paths through the treater via passages 44 as will become clear hereinafter.

An upper disc 48 of insulating material has a plurality of legs 50 depending therefrom and received at their feet by hollow bosses 52 on the upper plate 38. Thus, the upper disc 48 is held in vertically spaced relationship to the upper plate 38 and is keyed to a predetermined orientation. The disc 48 has circular openings therein of slightly larger diameter than the electrode units 30, each of such openings receiving a flanged collar 54 carried by the upper end portion of the respective electrode unit 30.

The top plate 20 is spaced above the disc 48 and has circular holes 56 therein normally closed and sealed by hole covers 58. The holes 56 are substantially larger in diameter than the electrode units 30 and are positioned as illustrated in alignment therewith to provide access to a particular unit 30 upon removal of the cover 58 thereabove.

Each of the electrode units 30 includes a tubular, electrically conductive electrode member 60 provided with integral, hemispherical end closures 62. The member 60 is covered by a sheath 64 of insulating material such as Teflon, and is provided with insulated supports 66 which extend from the end closures 62. A lead 68 is connected to the upper end closure 62 for the purpose of making an electrical connection to the member 60, the lead 68 extending through an insulated feed-through tube 70 that extends vertically from the upper support 66 through a packing nut 72 on the cover 58. Details of the construction of the insulated electrode supports 66 are set forth in my above-identified patent and hence will not be repeated herein. It should be noted that the insulating sheath 64 is continuous throughout the length of the member 60 and the supports 66, a final seal being effected by end caps 74. The various leads 68 from the units 30 continue through a packing nut 78 on the cover 14.

The lower disc 26 and the lower plate 40 of the electrode assembly 36 comprise an intake manifold 80 having a cylindrical chamber 82 therewithin defined by the disc 26 and the plate 40. An intake conduit 84 communicates with the chamber 82 through the tank sidewall 10 and is disposed in tangential relationship to the chamber 82. By virtue of the construction of the electrode assembly 36 werein circular openings are provided in the plate 40 receiving the open lower ends of the tubes 42, a plurality of outlet ports 86 are provided on the manifold 80 at the upper end of the cylindrical chamber 82.

Similarly, the upper disc 48 and the upper plate 38 of the assembly 36 comprise a discharge manifold 88 having a cylindrical chamber 90 therewithin defined by the disc 48 and the plate 38. A discharge conduit 92 communicates with the chamber 90 and is disposed in tangential relationship thereto. Inlet ports 94 of the manifold 88 are provided at the open upper ends of the tubes 42 through the plate 38.

Assembly 36 is also provided with a helical, fluid guide screw 96 for each electrode pair disposed about unit 30 and supported closely adjacent the manifold outlet port 86 associated therewith. Each guide screw 96 is constructed of a suitable insulating material such as impregnated phenolic cloth and extends approximately 360° leading in a counterclockwise direction (viewed from the top of the treater) from the port 86 toward port 94. The ramp-like, normally upper surface 98 of each guide screw 96 is held spaced apart at its opposed ends by an insulating stiffener 100. The outer diameter of each guide screw 96 is such that screw 96 is tightly received by the outer tube 42, and its inner diameter is such that the electrode unit 30 tightly fits within screw 96, the screw 96 thereby also serving as an auxiliary locating or positioning means for unit 30 in addition to a guide for flowing fluid.

The manifold arrangement and the locations of the electrode pairs may best be appreciated from viewing the alternative form of the treater illustrated in FIG. 2. The tangential relationship of the discharge conduit 92a to the cylindrical chamber 90a within the intake manifold 88a may be clearly seen. Fluid flow is counterclockwise in both the intake and the discharge manifolds, which is preferred in installations in the northern hemisphere, and it may be seen that the lower entrance end of each screw 96a is oriented to receive fluid as it moves counterclockwise in a spiral path of travel. Five of the inlet ports 94a are shown arranged in a circular pattern, and the sixth port 94a is located on the axis of the chamber 90a. The prime distinction, therefore, between the alternative form of FIG. 2 and the embodiment of FIG. 1 is that the alternative form employs the central port 94a at the axis of the chamber 82a (and corresponding central port, not shown, for the intake manifold). Both embodiments are otherwise essentially identical in that the intake and discharge manifold ports are arranged in a circular pattern, the number of such ports being dependent upon the size of the treater and the volume of fluid to be handled thereby.

In FIG. 3, an electrode unit 130 is shown which may be substituted for the units 30 illustrated in FIG. 1. The unit 130 has a tubular core 102 of insulating material which may, for example, comprise a phenolic cloth tube. A wire 104 is wound around the core 102 to form a coil thereon, the upper end of the coil terminating approximately in alignment with the upper end of the tubular wall 142 of the outer electrode. Thus, the coil of wire 104 presents a conductive outer surface which is at least coextensive with the tubular wall 142. However, unlike the conductive outer surface presented by the tubular member 60 in FIG. 1, the convolutions of the coil inherently present small radius edges for intensifying the electric field, as will be appreciated hereinafter.

The coil of wire 104 and the entire length of the core 102 are covered by a sheath 106 of insulating material such as Teflon, as in the embodiment of the electrode unit shown in FIG. 1. In order to make an electrical connection to the wire 104, the ends thereof at the top and bottom of the coil extend through the core 102 and are connected to a common lead 108 which extends through the feed-through tube 170.

In use, the configuration of the intake manifold 80 causes essentially laminar flow of the fluid in the manifold along a spiral path having convolutions of successively reduced diameter. As the fluid, such as water under pressure, enters the manifold 80, from the intake conduit 84, it is forced against the sidewall 10 of the tank as it flows in a counterclockwise direction. This initial action is the result of the tangential relationship of the conduit 84 to the chamber 82, which also assures that initial flow upon entry of the fluid into the manifold 80 will be smooth as the direction of flow changes from rectilinear to circular.

As the first convolution of the flow path in the manifold 80 is completed, the second convolution is formed within the first convolution so that the manifold 80, in effect, fills from the outside toward the center. Essentially, laminar flow is produced at all times as the fluid continues to spiral inwardly, and during such time the fluid is discharged through the ports 86 arranged around the chamber 82 in a circular pattern, it being noted that the ports are spaced along the flow path that the fluid is induced to travel.

The same whirling motion of the fluid is induced in the annular passages 44, i.e., the fluid emanating from a given outlet port 86 flows in a helical path longitudinally between the pair of inner and outer electrodes as it traverses the respective annular passage 44. This is, at least in part, due to the action generated by manifold 80, but in large measure is a direct result of the screws 96 which receive the fluid and force it to swirl in order to enter the major portion of passages 44. Such swirling is particularly desirable throughout passages 44 inasmuch as laminar flow is thereby maintained such that the fluid receives the full effects of the electrostatic field established between each set of electrodes.

Also of importance is the fact that the intake manifold 80 is disposed below discharge manifold 88 so that fluid is forced to flow vertically upwardly against the effects of gravity in traveling through the passages 44. In this manner, gravity is utilized beneficially as contrasted with detrimentally, such as in an arrangement in which the fluid would channel downwardly through passages 44 in a straight line without making continuous intimate contact with the electrodes themselves. By moving the fluid upwardly, it is continuously in intimate contact with the electrodes and is maintained in laminar flow such that exposure to the field is maximized.

After reaching the discharge manifold 88, the multiple paths recombine and the whirling motion of the fluid produced in the intake manifold 80 and tubes 42 is now induced in the discharge manifold 88. Accordingly, it may be appreciated that turbulence is avoided and that the flow patterns remain constant. Furthermore, particularly when treating water containing dissolved or suspended matter, the whirling motion of the water is useful as a self-cleaning action to flush the surfaces of the treater while the water is being subjected to the electric field treatment. This prevents the buildup of deposits on the surfaces of the treater which could otherwise occur.

Regarding the electric field treatment, each of the leads 68 from the inner electrodes is connected to a separate power supply, together with a common lead 69 connected to the sidewall 10. Use of separate power supplies for the electrode units 30 enables the operation of each to be individually checked. High voltage, direct potential (on the order of 3,000 volts, for example) is normally utilized, but in multiple stage treating apparatus an alternating potential is also useful in later stages of treatment to augment nucleation or coagulation of impurities, as is discussed in my above-identified patent. With reference to the treatment of water, the outer electrodes formed by the tubular walls 42 are left bare and in direct contact with the flowing water in a single stage treater as disclosed herein, and in the first treating stage of multiple stage treating apparatus formed by connecting two or more of the individual treaters in series in the waterline. Direct potential is applied with the inner electrode members 60 at positive polarity and the tank sidewall 10 (and hence the outer electrodes 42) at negative polarity. Dielectric unions (not shown) are employed in the waterline to isolate the treater from ground potential. For a polarizing action, such as in the second stage of a multiple stage treating apparatus, or when an alternating potential is applied, the electrode assembly 36 would also be covered with a layer of insulation to prevent direct contact with the flowing water.

Viewing one of the two flow paths between the intake and discharge manifolds 80 and 88 shown in FIG. 1, it may be seen that the portion of the electrode assembly 36 surrounding any one of the inner electrode units 30 has electrically conductive surfaces other than the internal, cylindrical surface defined by the tubular wall 42. At the ends of the wall 42, the plates 38 and 40 of the electrode assembly 36 present outer end surfaces 39 and 41 respectively that radiate outwardly from the ends of the wall 42 and extend away from the annular passage 44 transversely outwardly therefrom. Accordingly, the wall 42 is an inset portion of the composite electrode structure surrounding the inner electrode unit 30. The outer surface of the inner electrode member 60 is in significantly closer proximity to the wall 42 than to any other metallic surfaces of the treater structure. Since the member 60 and the wall 42 are oppositely charged, a radially directed electric field exists therebetween and, by virtue of the configuration just described, such field is concentrated between the upper and lower ends of the tubular wall 42. It is therefore assured that the electric field will be concentrated solely in the region of fluid flow and not between other metallic components of the treater where the field would have no effect on the flowing fluid. This arrangement renders it only necessary to space other metallic components of the treater a greater distance from the member 60 or its end closures 62 than the radial distance between member 60 and the wall 42.

Concentration of the electric field between the ends of the tubular wall 142 in FIG. 3 is likewise obtained. As compared with the unit 30 of FIG. 1 wherein the member 60 extends beyond the wall 42 to the hemispherical end closures 62, in FIG. 3, the longitudinal extent of the field is further restricted by the upper and lower ends of the coil of wire 104 since the coil is limited in length to approximately the length of the wall 142.

In the assembly of the treater, it is apparent that the lower disc 26, the electrode assembly 36, and the upper disc 48 may be lowered into place within the tank from the top thereof with the cover 14 and the top plate 20 removed. The electrode units 30 may then be slipped in place, proper coaxial alignment of the inner and outer electrodes being assured by the key pins 46 on the shelf rings 24 and 34 and the hollow bosses 52 on the electrode assembly 36. Accordingly, to remove one of the electrode units 30 for repair or replacement, the tank cover 14 is removed, followed by the packing nut 72, and then the hole cover 58 is removed to provide access to the upper end portion of the electrode unit 30. Withdrawal of the unit 30 is effected by simply shifting the same upwardly along its axis to withdraw the lower end portion thereof from the socket 28 for removal of the entire unit through the hole 56 in the top plate 20.

Having thus described the invention, what is claimed as new and desired to be secured by Letters Patent is:

1. Apparatus for electrostatically treating fluids comprising:
   an intake manifold having a cylindrical chamber therein for receiving a fluid under pressure to be treated and confining the fluid to a spiral path of travel in laminar flow having convolutions of successively reduced diameter;
   an intake conduit disposed in tangential relationship to said chamber and in flow communication therewith for introducing fluid to the chamber;
   said manifold having a plurality of outlet ports from the chamber spaced along said path and arranged in a generally circular pattern;
   a plurality of outer, tubular electrodes, each having an open end registering with a corresponding port for flow of the fluid therefrom;
   a plurality of inner electrodes each disposed in substantially coaxial relationship with a corresponding outer electrode and spaced therewithin to define an annular passage through each outer electrode for said flow of fluid from the respective port;

means for insulating at least one electrode of each pair of inner and outer electrodes from said fluid;

means coupled with said electrodes for connecting each pair of inner and outer electrodes across a source of electrical potential, whereby to establish a radially directed electric field in each of said passages to subject the fluid therein to the field as it flows through the respective outer electrode;

a discharge manifold spaced from said intake manifold and having a plurality of inlet ports aligned with said outlet ports;

each of said outer electrodes having an opposite, open end registering with a corresponding aligned inlet port of said discharge manifold, whereby said outer electrodes communicate the intake manifold with the discharge manifold for flow of said fluid to the latter;

said discharge manifold having a cylindrical, fluid-receiving chamber therein, and a discharge conduit disposed in tangential relationship to said chamber and communicating with the latter;

said inlet ports of the discharge manifold communicating with its chamber;

said inlet ports of the discharge manifold being arranged in the same generally circular pattern as the outlet ports of the intake manifold; and a fluid guide screw circumscribing each inner electrode respectively adjacent the proximal outlet port and within the corresponding passage for augmenting the swirling motion imparted to the fluid by said manifolds whereby to maintain laminar flow through said passages as well as said manifolds.

2. Apparatus as claimed in claim 1, each of said guide screws having a single convolution of approximately 360° and being remote from said discharge manifold.

3. Apparatus as claimed in claim 2, each of said guide screws extending helically in its passage progressively away from the corresponding port.

4. Apparatus as claimed in claim 2, each of said guide screws having an essentially planar surface presenting a ramp for fluid in its passage.

5. Apparatus as claimed in claim 1, said discharge manifold being spaced above said intake manifold whereby the fluid is forced through said passages against the effects of gravity.

6. Apparatus as claimed in claim 1, each of said inner electrodes being elongated in configuration and having an outwardly facing, longitudinally extending, electrically conductive surface;

each of said outer electrodes being provided with an elongated, tubular, electrically conductive wall defining said passage with the inner electrode therewithin and having a length no greater than the length of said conductive surface of the inner electrode;

there being electrically conductive surfaces radiating outwardly from said wall at its ends and extending away from said passage transversely outwardly therefrom, whereby the field between each pair of inner and outer electrodes is concentrated between said wall and said conductive surface of the inner electrode.

7. Apparatus as claimed in claim 1, each of said inner electrodes being tubular and electrically conductive, and provided with substantially hemispherical end closures.

8. Apparatus as claimed in claim 1, each of said inner electrodes including an elongated core of insulating material, and a wire element wound around said core to provide an outwardly facing, conductive surface.

9. In apparatus for electrostatically treating fluids:

a tank having an upright, tubular sidewall and a removable cover at its top;

a first annular shelf in said tank secured to said sidewall and projecting inwardly therefrom;

lower support structure resting on said shelf;

a second annular shelf in said tank spaced above said first shelf, secured to said sidewall and projecting inwardly therefrom;

an electrode assembly resting on said second shelf and including a plurality of upright, parallel tubes;

upper support structure provided with means depending therefrom and engaging said assembly for mounting the upper structure in spaced relationship thereto to define a first fluid chamber between the upper structure, said sidewall and said assembly;

said assembly, said sidewall and said lower structure defining a second fluid chamber therebetween;

each of said tubes having opposed, upper and lower ends communicating with the first and second chambers respectively; and an elongated, upright, inner electrode unit extending through each of said tubes respectively and spaced therewithin;

said lower structure having means for supporting said units at their lower end portions in coaxial alignment with respective tubes and receiving said lower end portions for free downward and upward movement of the units for installation and removal thereof through the top of the tank when the cover is removed;

said upper structure supporting said units at their upper end portions in said coaxial alignment with respective tubes;

said upper end portions of the units extending upwardly through said upper structure for access from the top of the tank for said installation and removal of the units.

10. In apparatus as claimed in claim 9, said first shelf, said second shelf, and said assembly having means for keying said lower structure, said assembly, and said upper structure in proper positional interrelationship to assure said coaxial alignment of the units and the tubes.

References Cited
UNITED STATES PATENTS

| | | | |
|---|---|---|---|
| 919,445 | 4/1909 | Lohman | 204—321 |
| 1,035,489 | 8/1912 | Steynis | 204—321 |
| 2,830,945 | 4/1958 | Keidel | 204—130 |
| 823,671 | 6/1906 | Dieterich | 204—149 |
| 1,873,857 | 8/1932 | Worthington et al. | 204—302 |

JOHN H. MACK, Primary Examiner

T. M. TUFARIELLO, Assistant Examiner